UNITED STATES PATENT OFFICE.

ALOIS SCHAIDHAUF, OF FRANKFORT-ON-THE-MAIN, GERMANY, ASSIGNOR TO THE ROESSLER & HASSLACHER CHEMICAL COMPANY, OF NEW YORK, N. Y., A CORPORATION OF NEW YORK.

STABLE HYDROGEN PEROXID AND METHOD OF MAKING THE SAME.

1,109,791.  Specification of Letters Patent.  Patented Sept. 8, 1914.

No Drawing.  Application filed June 20, 1912.  Serial No. 704,787.

*To all whom it may concern:*

Be it known that I, ALOIS SCHAIDHAUF, a subject of the Emperor of Germany, and a resident of Frankfort-on-the-Main, Germany, have invented certain new and useful Improvements in Stable Hydrogen Peroxid and Methods of Making the Same, of which the following is a specification.

This invention relates to a stable hydrogen peroxid and method of making the same.

The solution of the problem of preserving the stability of a hydrogen-peroxid solution is very important as hydrogen-peroxid solutions are used for many industrial purposes. In order to achieve this end the addition of various bodies to hydrogen-peroxid solutions has been suggested, but none of such bodies has yet produced a satisfactory effect inasmuch as either the so-called stability was not lasting, or the suggested additions changed the color of the solution, or they were a disturbing element in the industrial or other application of the solutions.

I have made the surprising discovery that the addition of a small quantity of soap to neutral solution of hydrogen-peroxid renders the same very stable at the usual as well as at higher temperatures.

The following example serves to illustrate my invention: To a given quantity of a neutral solution carrying 3% hydrogen-peroxid I add 0.2% of Marseille soap thoroughly mixing the ingredients. Marseille soap is usually made from olive oil and is considered to be a standard neutral soap. In the beginning the mixture is of neutral reaction but it soon undergoes dissociation if allowed to stand at usual temperature. If desired this dissociation may be accelerated by gently heating the mixture to a temperature of about 55° centigrade, whereby it then positively shows the acid reaction on litmus-paper.

A hydrogen-peroxid solution thus treated has a surprisingly high degree of stability and this fact is the more astonishing as the acidity of the hydrogen-peroxid solution, resulting from the dissociation of the soap, is such a minute one that a trace of a very dilute alkaline lye is sufficient to turn the acid reaction into the contrary.

There is reason to suppose that the double decomposition between hydrogen-peroxid and the soap, independently of the question whether the reaction has already advanced to the stage indicated by the acid reaction, results in producing a specific anti-catalyzer which exerts such a beneficial influence on the hydrogen-peroxid, or one may suppose that the soap itself is the anti-catalyzer and that the acid reaction finally resulting is only an accessory effect.

What I claim and desire to secure by Letters Patent is:

1. The method of rendering a hydrogen peroxid solution stable which consists in adding soap to a neutral solution of hydrogen peroxid.

2. The method of rendering a hydrogen peroxid solution stable which consists in adding soap to a neutral solution of hydrogen peroxid and heating the mixture to accelerate the dissociation of the soap.

3. A hydrogen peroxid solution containing soap.

In testimony whereof I have signed my name to this specification in the presence of two subscribing witnesses.

DR. ALOIS SCHAIDHAUF.

Witnesses:
 RUDOLF THILENIUS,
 THEODOR F. POHL.